US012043874B2

(12) United States Patent
Karuppaiah et al.

(10) Patent No.: US 12,043,874 B2
(45) Date of Patent: Jul. 23, 2024

(54) SYSTEM AND METHOD FOR REDUCING ORE USING HYDROGEN AS A REDUCING AGENT

(71) Applicant: OHMIUM INTERNATIONAL, INC., Incline Village, NV (US)

(72) Inventors: Chockkalingam Karuppaiah, Fremont, CA (US); Arne Ballantine, Incline Village, NV (US); Muralidhar Venkatraman, Bengaluru (IN)

(73) Assignee: Ohmium International, Inc., Newark, CA (US)

(*) Notice: Subject to any disclaimer, the term of this patent is extended or adjusted under 35 U.S.C. 154(b) by 160 days.

(21) Appl. No.: 17/539,381

(22) Filed: Dec. 1, 2021

(65) Prior Publication Data

US 2022/0177984 A1 Jun. 9, 2022

Related U.S. Application Data

(60) Provisional application No. 63/120,784, filed on Dec. 3, 2020.

(51) Int. Cl.
*C21B 5/00* (2006.01)
*B01D 53/32* (2006.01)
(Continued)

(52) U.S. Cl.
CPC ............ *C21B 5/001* (2013.01); *B01D 53/326* (2013.01); *C21B 7/002* (2013.01); *C25B 1/04* (2013.01); *C25B 13/08* (2013.01); *C25B 15/081* (2021.01); *B01D 2256/16* (2013.01); *B01D 2258/025* (2013.01); *C21B 2005/005* (2013.01); *C21B 2100/20* (2017.05)

(58) Field of Classification Search
CPC .. C25B 1/02; C25B 1/04; C25B 1/042; B01D 53/326
See application file for complete search history.

(56) References Cited

U.S. PATENT DOCUMENTS 5,603,748 A * 2/1997 Hirsch ................... C21B 13/14
75/436
8,669,499 B2 3/2014 Conrad
(Continued)

FOREIGN PATENT DOCUMENTS

WO WO-2011116141 A2 * 9/2011 ............. B82Y 30/00
WO 2018236649 A1 12/2018
(Continued)

OTHER PUBLICATIONS

S. Shiva Kumar, V. Himabindu, Hydrogen production by PEM water electrolysis—A review, Mar. 29, 2019 Materials Science for Energy Technologies, vol. 2, Issue 3, 2019, p. 442-454 (Year: 2019).*
(Continued)

*Primary Examiner* — Vanessa T. Luk
*Assistant Examiner* — Nikolas Takuya Pullen
(74) *Attorney, Agent, or Firm* — Polsinelli LLP

(57) ABSTRACT

A system for reducing ore includes a hydrogen supply unit configured to supply hydrogen, a furnace configured to reduce the ore using the supplied hydrogen, and a hydrogen recovery unit configured to recover hydrogen from an exhaust gas that is exhausted from the furnace.

12 Claims, 11 Drawing Sheets

(51) Int. Cl.
*C21B 7/00* (2006.01)
*C25B 1/04* (2021.01)
*C25B 13/08* (2006.01)
*C25B 15/08* (2006.01)

(56) References Cited

U.S. PATENT DOCUMENTS

| | | | |
|---|---|---|---|
| 2006/0065520 A1* | 3/2006 | Ballantine | H01M 8/2483 429/444 |
| 2010/0186644 A1 | 7/2010 | Sugitatsu et al. | |
| 2011/0180416 A1 | 1/2011 | Kurashina et al. | |
| 2014/0134556 A1* | 5/2014 | Eisman | F27D 7/02 432/23 |
| 2014/0230606 A1 | 8/2014 | Traversac et al. | |
| 2016/0168730 A1* | 6/2016 | Watanabe | B01D 63/0822 204/253 |
| 2020/0168926 A1 | 5/2020 | Kozuka | |
| 2021/0155491 A1 | 5/2021 | Ballantine et al. | |
| 2021/0156038 A1 | 5/2021 | Ballantine et al. | |
| 2021/0156039 A1 | 5/2021 | Ballantine et al. | |
| 2021/0179451 A1 | 6/2021 | Ballantine et al. | |
| 2021/0179471 A1 | 6/2021 | Ballantine et al. | |

FOREIGN PATENT DOCUMENTS

| | | |
|---|---|---|
| WO | WO 2019/219340 | 11/2019 |
| WO | WO 2022/119882 | 6/2022 |

OTHER PUBLICATIONS

Encyclopedia Britannica, Blast Furnace Web Article, accessed Dec. 1, 2021.
Wikipedia, Blast Furnace Web Article, accessed Dec. 1, 2021.
Rickets, John. Shelton Iron and Steel Blast Furnace Web Article, accessed Dec. 1, 2021.
Wiebe, W. et al., "Hydrogen pump for hydrogen recirculation in fuel cell vehicles," E3S Web of Conferences, vol. 155, No. 01001, (2020); https://doi.org/10.1051/e3sconf/202015501001.
U.S. Appl. No. 17/402,821, filed Aug. 16, 2021, OHMIUM INTERNATIONAL, INC.
U.S. Appl. No. 17/507,156, filed Oct. 21, 2021, OHMIUM INTERNATIONAL, INC.
PCT Application No. PCT/US2021/061335 International Search Report and Written Opinion dated Mar. 24, 2022.

* cited by examiner

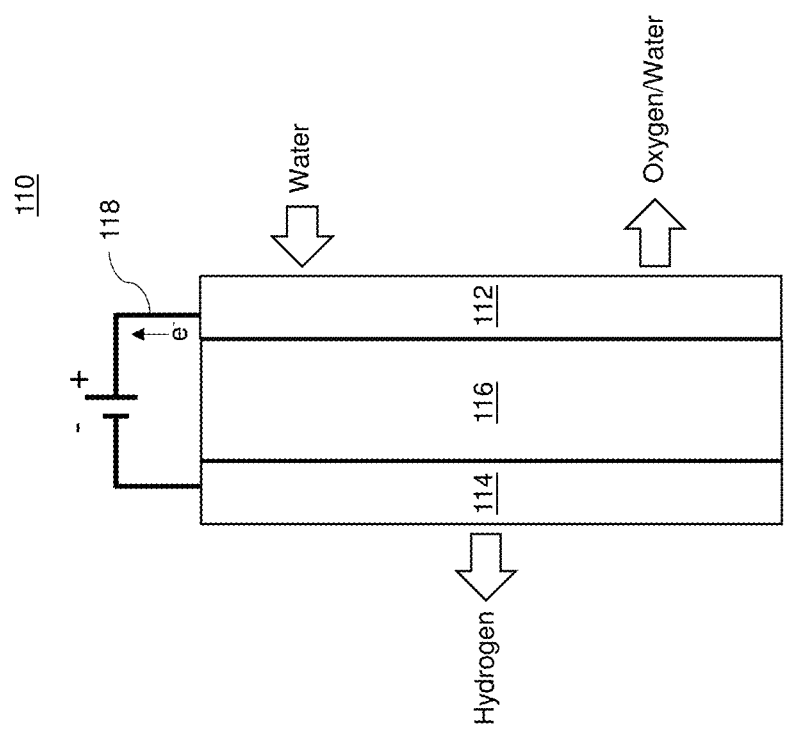

SYSTEM AND METHOD FOR REDUCING ORE USING HYDROGEN AS A REDUCING AGENT

RELATED APPLICATIONS

This application claims the benefit of priority from U.S. Provisional Application No. 63/120,784, entitled "HYDROGEN RECOVERY, HEAT RECOVERY AND OXYGEN HARVESTING FOR APPLICATIONS IN BLAST FURNACES FOR FE ORE REDUCTION" filed on Dec. 3, 2020, the entire contents of which are incorporated herein by reference for all purposes.

TECHNICAL FIELD

An embodiment of the present disclosure is directed to a system for reducing ore and more particularly, a system for reducing ore that includes a hydrogen supply unit configured to supply hydrogen, and a furnace configured to use the supplied hydrogen to reduce the ore.

BACKGROUND

Furnaces such as blast furnaces may use coal as a reducing agent for reducing an ore to metal. The combustion of coal in the furnace may also generate heat which helps to reduce the ore. However, the use of coal may cause these furnaces to be major emitters of carbon dioxide. Therefore, to help reduce carbon dioxide emissions, some conventional furnaces may replace at least a portion of the coal with hydrogen as a reducing agent for reducing the ore.

SUMMARY

An aspect of the present disclosure is directed to a system for reducing ore including a hydrogen supply unit configured to supply hydrogen, a furnace configured to reduce the ore using the supplied hydrogen, and a hydrogen recovery unit configured to recover hydrogen from an exhaust gas that is exhausted from the furnace.

Another aspect of the present disclosure is directed to a method of reducing ore, including supplying hydrogen, reducing the ore in a furnace using the supplied hydrogen, and recovering hydrogen from an exhaust gas that is exhausted from the furnace.

Another aspect of the present disclosure is directed to a system including an electrolyzer, a blast furnace, and a conduit fluidly connecting a hydrogen outlet of the electrolyzer to the blast furnace.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIG. 1C illustrates a PEM electrolyzer that may serve as the hydrogen supply unit, according to one or more embodiments.

Figure 1A:
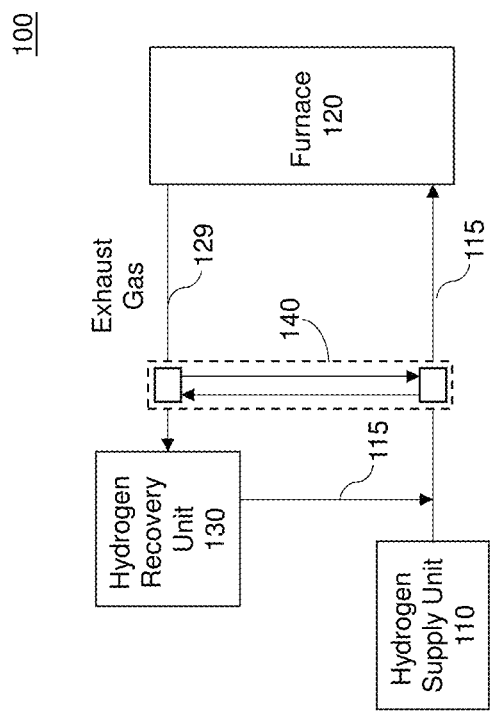
FIG. 1A illustrates a system for reducing ore (e.g., iron ore) according to one or more embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will be understood that, although the terms first, second, etc. are, in some instances, used herein to describe various elements, these elements should not be limited by these terms. These terms are used only to distinguish one element from another.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting" or "in accordance with a determination that," depending on the context.

As used herein, two elements are "fluidly connected" if there is a direct or indirect fluid connection between the two elements such that a fluid (e.g., liquid and/or gas) may flow between the two elements. The two elements are directly fluidly connected if the two elements physically contact each other. The two elements are indirectly fluidly connected if they do not physically contact each other, but there is at least one third element (e.g., pipe, conduit, manifold, etc.) that allows the fluid to flow therethrough between the first and the second elements.

In conventional furnaces that use hydrogen as a reducing agent for reducing the ore, studies have shown that a significant portion of the hydrogen that is input to the furnace (e.g., 30% to 50%) may be unutilized. This unutilized portion may be exhausted from the furnace with other exhaust gases. Given the kinetics and space velocity, this may result in a higher energy demand for producing green hydrogen. In addition, since the combustion of coal is used to generate heat in conventional furnaces, to the extent that hydrogen is used to replace coal as a reducing agent, a generation of heat in the furnace may be lost.

An embodiment of the present disclosure may include, therefore, the recovery of hydrogen and heat from the exhaust gas of the furnace. The embodiment may also include harvesting of oxygen that may be added to the furnace to enhance combustion.

FIG. 1A illustrates a system 100 for reducing a metal containing ore (e.g., iron ore) according to one or more embodiments. The ore may contain various metal compounds, such as metal oxides, carbonates, hydroxides, etc. For example, iron ore may contain iron oxide, carbonate and/or hydroxide, such as magnetite ($Fe_3O_4$), hematite ($Fe_2O_3$), limonite ($2Fe_2O \cdot 3H_2O$), goethite (FeO(OH)), and/or siderite ($FeCO_3$), as well as slag, including silica, phosphorus oxide, etc. As illustrated in FIG. 1A, the system 100 may include a hydrogen supply unit 110 configured to supply hydrogen (e.g., generate hydrogen), a furnace 120 (e.g., a blast furnace) configured to reduce the ore using the supplied hydrogen, and a hydrogen recovery unit 130 configured to recover hydrogen from an exhaust gas that is exhausted from the furnace 120.

A mixed gas transport line 115 may transport a mixed gas including the supplied hydrogen and recovered hydrogen from the hydrogen supply unit to the furnace 120. A recovered hydrogen line 105 may transport the received hydrogen from the hydrogen recovery unit 130 to the mixed gas transport line. An exhaust line 129 may transport the exhaust gas away from the furnace 120 to the hydrogen recovery unit 130. The system 100 may also include a heat exchanger 140 configured to heat the mixed gas (e.g., supplied hydrogen and recovered hydrogen) with heat recovered from the exhaust gas. The heat exchanger 140 may be fluidly connected between the exhaust line 129 and mixed gas transport line 115. This configuration may allow the heat exchanger 140 to recover heat from the exhaust gas flowing through the exhaust line 129, and use the recovered heat to heat the mixed gas that includes the supplied hydrogen and recovered hydrogen flowing through the mixed gas transport line 115.

The heat exchanger 140 may include any structure that may be used to transfer heat from the exhaust gas in the exhaust line 129 to the mixed gas in the mixed gas transport line 115. In one embodiment, the heat exchanger 140 may comprise a direct heat exchanger, such as a parallel plate type, a tube and manifold type, or concentric shell type heat exchanger, in which the heat from the exhaust gas in the exhaust line 129 is transferred directly to the mixed gas in the mixed gas transport line 115 through a wall of the heat exchanger.

Figure 1B:
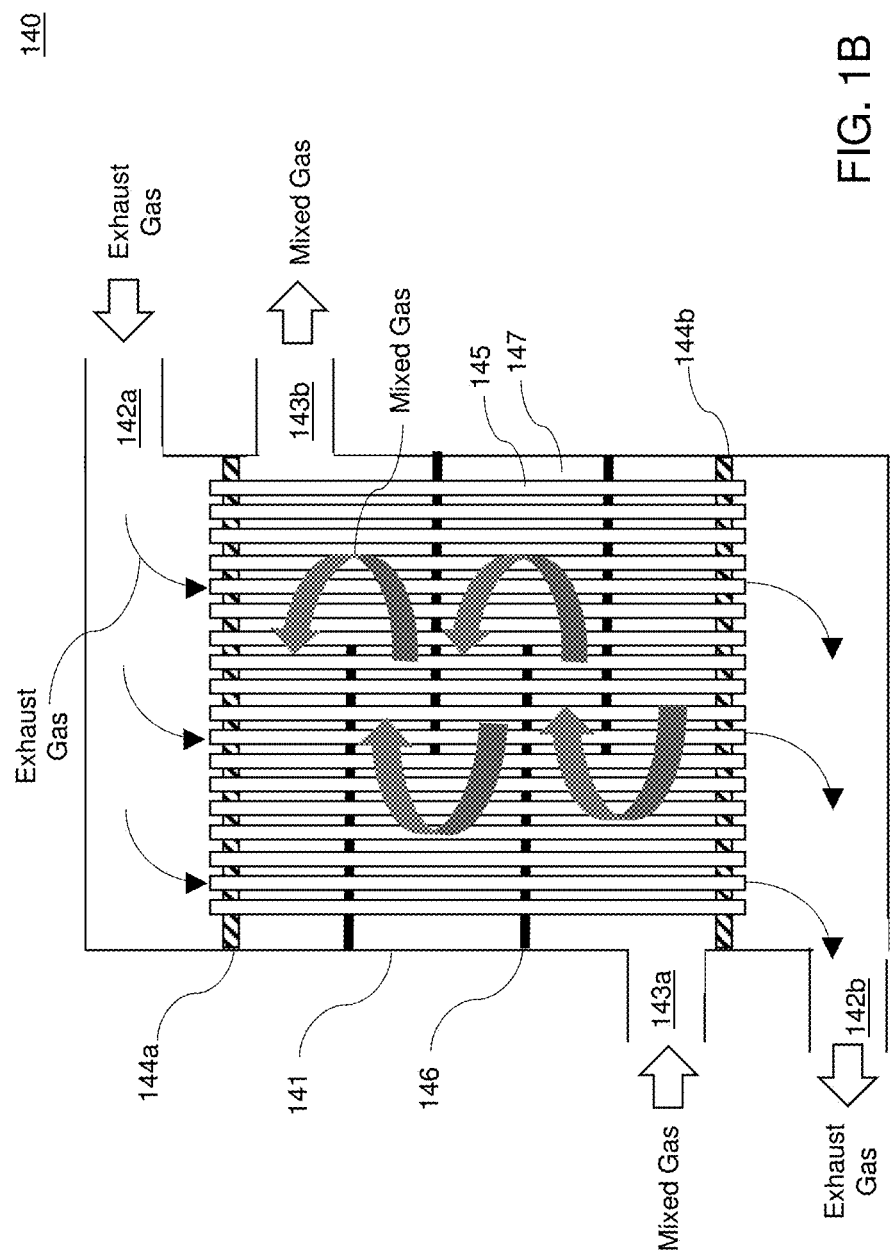
FIG. 1B illustrates heat exchanger, according to one or more embodiments.

FIG. 1B illustrates one non-limiting configuration of a direct tube and manifold type heat exchanger 140, according to one or more embodiments. As illustrated in FIG. 1B, the heat exchanger 140 may include a shell 141 (e.g., metal shell). The shell 141 may include an exhaust gas intake port 142a at a first end of the shell 141 and an exhaust gas exit port 142b at a second end of the shell 141 that is opposite the first end. The exhaust gas may enter the shell 141 via the exhaust gas intake port 142a and exit the shell 141 via the exhaust gas exit port 142b. The shell 141 may also include a mixed gas intake port 143a at the second end of the shell 141 and a mixed gas exit port 143b at the first end of the shell 141. The mixed gas may enter the shell 141 via the mixed gas intake port 143a and exit the shell 141 via the mixed gas exit port 143b. With this configuration, the exhaust gas and the mixed gas may have a counter flow configuration inside the shell 141.

The heat exchanger 140 may also include an inner chamber (e.g., manifold) 147 that is sealed at the first end by a first wall 144a that is fixed to an inner wall of the shell 141, and sealed at the second end by a second wall 144b that is fixed to the inner wall of the shell 141. The mixed gas intake port 143a and mixed gas exit port 143b are fluidly connected to the inner chamber 147 so that the mixed gas is contained within the inner chamber of the shell 141.

A plurality of hollow tubes 145 (e.g., metal tubes) may be arranged in the shell 141 from a direction of the first end to the second end through the inner chamber 147. The plurality of hollow tubes 145 may protrude through the first wall 144a and the second wall 144b. The exhaust gas intake port 142a and exhaust gas exit port 142b may be formed in the shell 141 outside the inner chamber 147 so that the exhaust gas is separated from the inner chamber 147.

The exhaust gas may enter the plurality of hollow tubes 145 at the first end near the exhaust gas intake port 142a, and exit the plurality of hollow tubes 145 at the second end near the exhaust gas exit port 142b. The mixed gas may enter the inner chamber 147 at the second end of the shell 141 and be flowed over the plurality of hollow tubes 145. A plurality of baffles 146 may be fixed to the inner wall of the shell 141 in the inner chamber 147. The mixed gas may be heated as it flows through the inner chamber 147 around the baffles 146 and over the plurality of hollow tubes (containing the hot exhaust gas) on its path from the mixed gas intake port 143a to the mixed gas exit port 143b.

In an alternative embodiment, the mixed gas and the hot exhaust gas may flow on opposite sides of a heat exchange plate in a parallel plate type heat exchanger. In another alternative embodiment, one of the mixed gas and the hot exhaust gas may flow through an inner tube, while the other one of the mixed gas and the hit exhaust gas may flow through an outer tube of a concentric tube type heat exchanger in which the inner tube is located inside the outer tube.

In another alternative embodiment, the heat exchanger 140 may comprise an indirect heat exchanger which uses a heat transfer fluid between the exhaust line 129 and the mixed gas transport line 115. For example, the indirect heat exchanger 140 may include, for example, one or more of tubes that contain heat transfer fluid (e.g., water, coolant, etc.) and are arranged to contact the exhaust line 129 at one end and contact the mixed gas transport line 115 at the other end. The heat transfer fluid may be circulated between the exhaust line 129 and the mixed gas transport line 115 in order to transfer heat from the exhaust line 129 to the mixed gas transport line 115. For example, the heat exchanger 140 may have an economizer-type design in which the exhaust gas is flowed over the tubes to heat the heat transfer fluid, and the hot heat transfer fluid may then be circulated to the mixed gas transport line 115 where the mixed gas in the mixed gas transport line 115 is flowed over the tubes in order to heat the mixed gas in the mixed gas transport line 115.

Referring again to FIG. 1A, the hydrogen supply unit 110 may include any structure (e.g., vessel, storage tank, piping) for supplying hydrogen to the furnace 120. In at least one embodiment, the hydrogen supply unit 110 may include, for example, a proton exchange membrane (PEM) electrolyzer (e.g., a stack of PEM electrolyzer cells).

FIG. 1C illustrates a PEM electrolyzer cell that may serve as the hydrogen supply unit 110, according to one or more embodiments. The PEM electrolyzer cell may be configured to perform an electrolysis operation on water from a water supply, such as a water pipe or water storage tank.

As illustrated in FIG. 1C, the PEM electrolyzer may include an anode 112 and cathode 114. The anode 112 and cathode 114 may be separated by a polymer electrolyte membrane 116 (e.g., a proton conducting membrane). Water from the water supply may be provided to the anode 112 where the water may be electrochemically split into oxygen ($O_2$), protons ($H^+$) and electrons (e) ($H_2O \rightarrow 2H^+ + \frac{1}{2}O_2 + 2e^-$). The protons ($H^+$) travel through the PEM membrane 116 to the cathode 114. The electrons ($e^-$) may exit from the anode 112 through an external power circuit 118 which may provide a driving force (e.g., cell voltage) for the water electrolysis. At the cathode 114, the protons ($H^+$) and electrons ($e^-$) may recombine ($2H^+ + 2e^- \rightarrow H_2$) to produce the hydrogen that may be generated by the PEM electrolyzer cell.

As illustrated in FIG. 1C, oxygen produced by the water electrolysis may be output from the PEM electrolyzer in a water/oxygen output stream (e.g., oxygen and water vapor). A separating unit may be used to separate the oxygen (e.g., harvest the oxygen) from the water in the water/oxygen output stream, as will be described in more detail below. The separated oxygen (e.g., harvested oxygen) may be supplied (e.g., with the hydrogen generated by the PEM electrolyzer) to the furnace 120 and used to enhance combustion in the furnace 120.

Referring again to FIG. 1A, the furnace 120 may include any structure that may be used to heat and melt ore (e.g., metal ore) in order to remove gangue and slag from the ore. The heat energy that fuels the furnace 120 may be supplied by fuel combustion such as by burning coal, by electricity (e.g., an electric arc furnace), or by induction heating (e.g., an induction furnace).

Figure 1D:
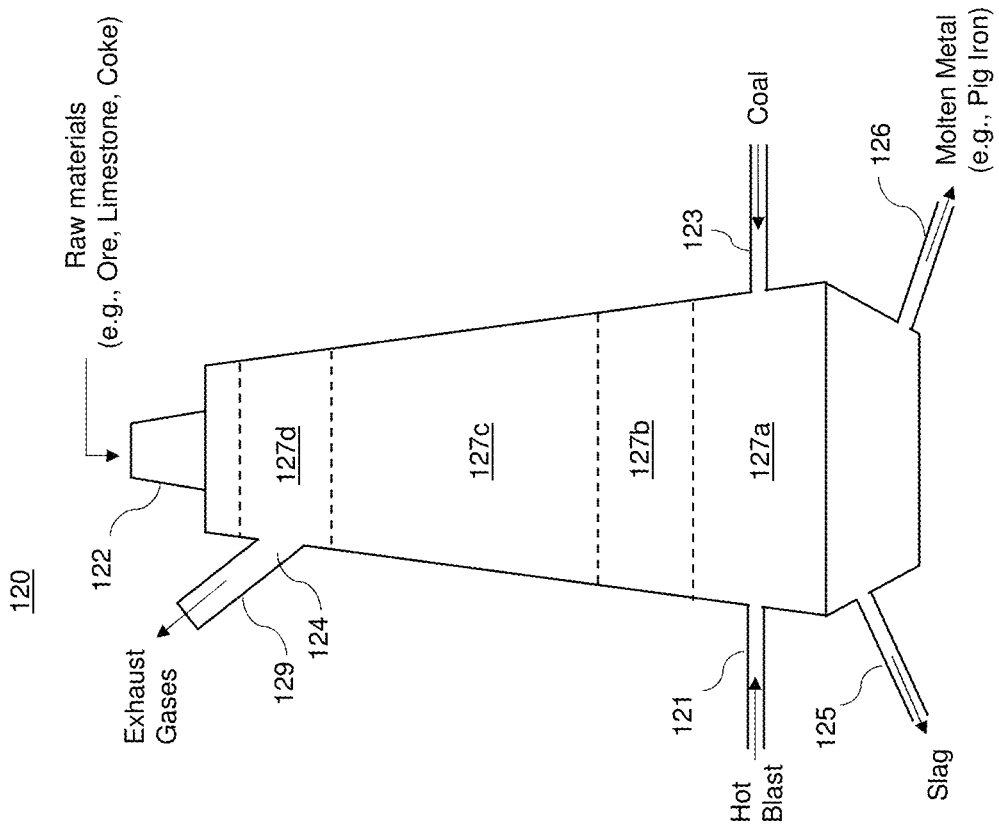
FIG. 1D illustrates a blast furnace, according to one or more embodiments.

In at least one embodiment, the furnace 120 may include, for example, a blast furnace. FIG. 1D illustrates a blast furnace that may serve as the furnace 120, according to one or more embodiments.

As illustrated in FIG. 1D, the blast furnace may include a hot blast input structure 121 in which a hot blast of air (e.g., from a Cowper stove) may be input to the furnace 120. The hot blast input structure 121 may include, for example, a series of pipes or nozzles (e.g., water-cooled copper nozzles) called tuyeres through which a hot blast (e.g., hot air) may be injected into the blast furnace. The mixed gas transport line 115 may also be fluidly connected to the hot blast input structure 121 so that the supplied hydrogen and recovered hydrogen may be input to the furnace 120 together with the hot blast of air. The hydrogen added to the hot blast may be used to increase the efficiency of the blast furnace. A temperature of the hot blast, for example, may be in a range from 900° C. to 1300° C.

The blast furnace may also include a raw material charging structure 122 that may be used for charging raw materials into the blast furnace. The raw materials may include, for example, ore (e.g., iron ore), limestone, and coke. The blast furnace may also include a coal input structure 123 that may be used to input coal (e.g., pulverized coal) to the blast furnace. The coal may be used to enhance combustion in the blast furnace.

Alternatively, the coal may input to the furnace 120 along with the hot blast of air through the hot blast input structure 121. Thus, for example, the hot blast input structure 121 may be used to input the hot blast of air along with the supplied hydrogen, recovered hydrogen and pulverized coal. Alternatively, the coal may input to the furnace 120 along with the hydrogen from the mixed gas transport line 115 through the coal input structure 123.

The blast furnace may also include an exhaust 124 that may exhaust gases that are produced in the blast furnace and/or unused in the blast furnace. The exhaust gases may include, for example, nitrogen, unreacted hydrogen, carbon dioxide and carbon monoxide. The exhaust 124 may be fluidly connected to the above-described exhaust line 129. The blast furnace may also include one or more devices for removing particles (e.g., fine particles, coarse particles, electrically-charged particles) from the exhaust gas. For example, the blast furnace may include a dust collector such as an inertial separator, a baghouse, or an electrostatic precipitator.

The blast furnace may also include a slag removal trough 125 that may allow the removal of slag from the blast furnace. The blast furnace may also include a metal removal trough 126 that may allow the removal of metal (e.g., molten pig iron) produced by the reduction of the ore in the blast furnace.

Chemical reactions (e.g., reduction of the ore) may take place throughout the blast furnace as the raw material (e.g., ore, coke and limestone) falls downward from the top of the blast furnace. The downward flow of the raw materials in contact with an upflow of hot, carbon monoxide-rich combustion gases may provide a countercurrent exchange that may facilitate the chemical reactions. The blast furnace may include at least four zones including, for example, a melting zone 127a, a first reduction zone 127b in which a first oxide may be reduced, a second reduction zone 127c in which a second oxide may be reduced, and a re-heating zone 127d. For example, where the blast furnace is used for reducing iron ore, ferrous oxide may be reduced in the first reduction zone 127b, and ferric oxide may be reduced in the second reduction zone 127c.

Referring again to FIG. 1A, the hydrogen recovery unit 130 may include any structure for recovering hydrogen from the exhaust gases. In at least one embodiment, the hydrogen recovery unit 130 may include a PEM hydrogen pump (e.g., electrochemical hydrogen pumping stack).

Figure 1E:
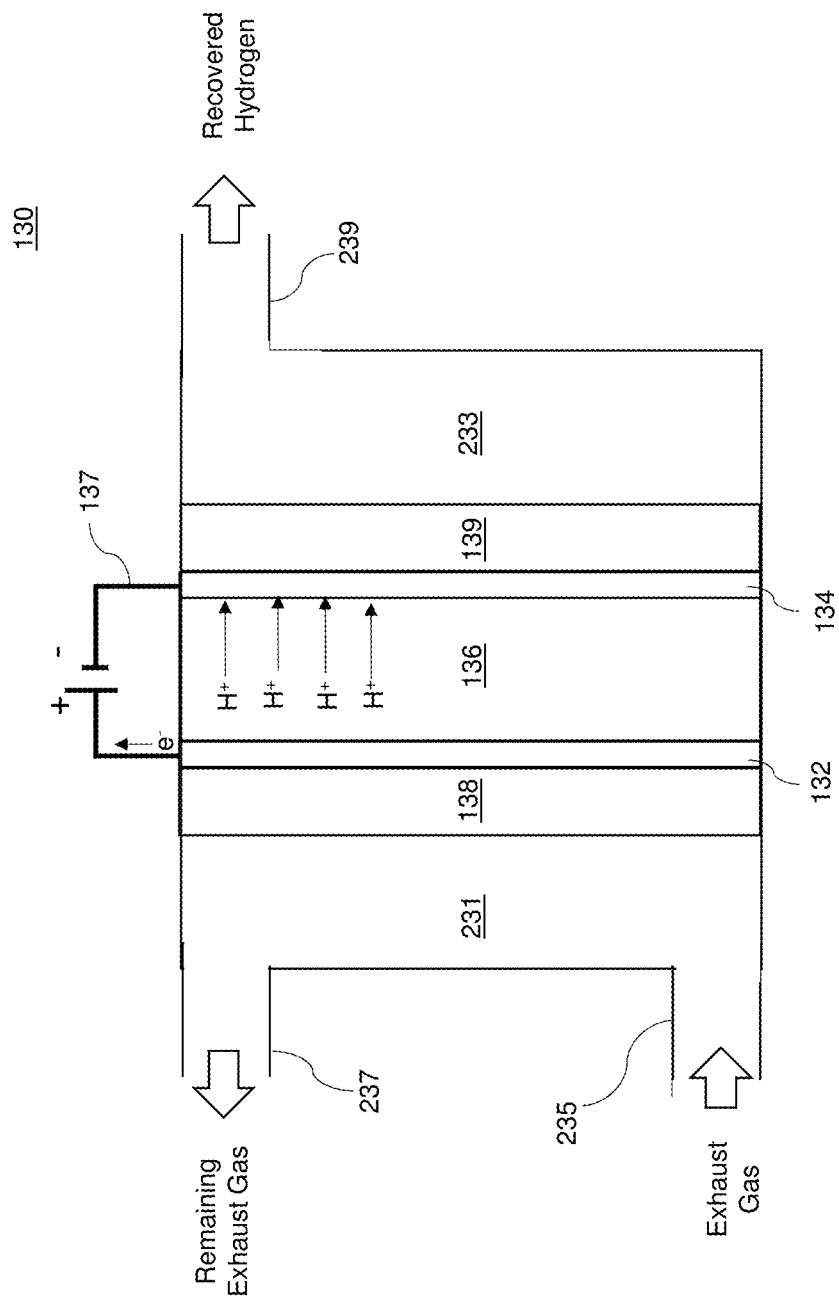
FIG. 1E illustrates a PEM hydrogen pump, according to one or more embodiments.

FIG. 1E illustrates a PEM hydrogen pump that may serve as the hydrogen recovery unit 130, according to one or more embodiments. As illustrated in FIG. 1E, the hydrogen pump may comprise a stack of PEM fuel cells, each of which includes an anode 132 and a cathode 134. The anode 132 and cathode 134 may be separated by a polymer electrolyte membrane 136 (e.g., a proton conducting membrane). The hydrogen pump may also include a power circuit 137 that is connected to the anode 132 and cathode 134. The power circuit 137 receives current generated during operation of the hydrogen pump for hydrogen recovery.

The hydrogen pump may also include an anode-side gas diffusion layer (GDL) 138 and a cathode-side GDL 139. The anode-side gas diffusion layer (GDL) 138 and the cathode-side GDL 139 may help to inhibit flooding in the hydrogen pump and, in particular, anode-side flooding. Each of the anode-side gas diffusion layer (GDL) 138 and a cathode-side GDL 139 may include, for example, a sintered titanium thin sheet. The sintered titanium thin sheet may include small pores having a diameter, for example, in a range from 10 μm to 100 μm. The sintered titanium thin sheet may also have a porosity that is less than about 30%.

The hydrogen pump may also include an anode-side chamber 231 (e.g., low pressure chamber) on a side of the anode-side GDL 138, and a cathode-side chamber 233 (e.g., high pressure chamber) on a side of the cathode-side GDL 139. The anode-side chamber 231 may include an exhaust gas intake port 235. The exhaust line 129 may be fluidly connected to the exhaust gas intake port 235. The exhaust gas may be transported from the furnace 120 to the exhaust gas intake port 235 via the exhaust line 129. The exhaust gas may flow against a surface of the anode-side GDL 138 by the anode-side chamber 231. The anode-side chamber 231 may also include a remaining gas exit port 237. The remaining gas may be constituted of the exhaust gas that enters the exhaust gas intake port 235 less the recovered hydrogen that has been separated (e.g., recovered) from the exhaust gas by the hydrogen pump.

The cathode-side chamber 233 may include a recovered hydrogen exit port 239. The recovered hydrogen exit port 239 may discharge the recovered hydrogen that has been separated (e.g., recovered) from the exhaust gas by the hydrogen pump. The recovered hydrogen may be fed to the mixed gas transport line 115 and fed to the furnace 120 along with the supplied hydrogen from the hydrogen supply unit 110.

By applying the electrical potential from the external power circuit 138, hydrogen in the exhaust gas on the anode side may be forced to split up into protons and electrons (e.g., $H_2 \rightarrow 2H^+ + 2e^-$). The difference in potential leads to a transport of the protons ($H^+$) from the anode side to the cathode side through the PEM membrane 136. At the cathode side, the electrons ($e^-$) and protons ($H^+$) recombine to form hydrogen ($H_2$) (e.g., $2H^+ + 2e^- \rightarrow H_2$).

As illustrated in FIG. 1E, the hydrogen pumping action in the hydrogen pump may separate hydrogen from the exhaust gas as only hydrogen protons ($H^+$) are pumped through the PEM membrane 136. Other gases in the exhaust gas (e.g., nitrogen, carbon monoxide and carbon dioxide) may be unaffected by the pumping action, and remain in the anode-side chamber 231 where they can be purged via the remaining gas exit port 237. Since the hydrogen pump may constitute a closed system, the pumping action may increase the pressure on the cathode side of the hydrogen pump. Thus, a pressure in the cathode-side chamber 233 may be greater than a pressure in the anode-side chamber 231.

Figure 2A:
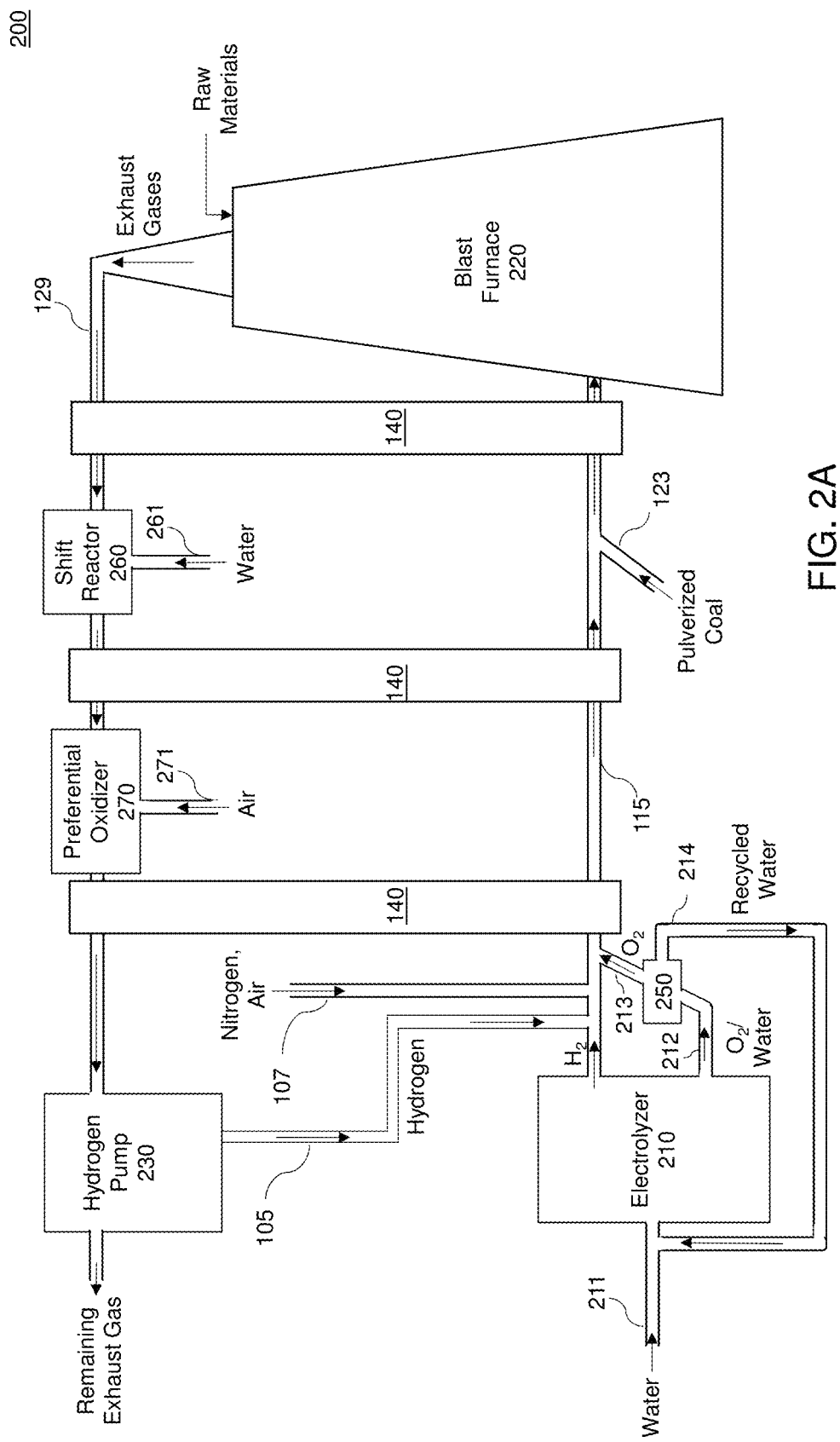
FIG. 2A illustrates a system for reducing ore (e.g., iron ore), according to one or more embodiments.

FIG. 2A illustrates a system 200 for reducing ore (e.g., iron ore) which illustrates additional system components that are not shown in FIG. 1A, according to one or more embodiments. As illustrated in FIG. 2A, the system 200 may include an electrolyzer 210 (e.g., PEM electrolyzer) (e.g., described above as the hydrogen supply unit 110 and shown in FIG. 1A), a blast furnace 220 (e.g., described above as the furnace 120 and shown in FIG. 1A), and a hydrogen pump 230 (e.g., PEM hydrogen pump) (e.g., described above as the hydrogen recovery unit 130 and shown in FIG. 1A).

The system 200 may also include the mixed gas transport line 115 which is fluidly connected to an outlet of the PEM electrolyzer 210 and to an inlet the furnace 220, and configured to transport the supplied hydrogen and the recovered hydrogen to the furnace. The system 200 may also include the exhaust line 129 fluidly connected to an outlet of the furnace 220 and to an inlet of the PEM hydrogen pump 230, and configured to transport the exhaust gas from the furnace to the PEM hydrogen pump. The system 200 may also include a recovered hydrogen line 105 fluidly connected to an outlet of the PEM hydrogen pump 230 and to the mixed gas transport line 115, and configured to transport the recovered hydrogen from the PEM hydrogen pump to the mixed gas transport line.

The system 200 may also include a plurality (e.g., three) of the heat exchangers 140 that were described above with respect to the system 100 (e.g., see FIG. 1B). It should be noted that the heat exchangers 140 may be configured to have more connection points in the exhaust line 129 than in the mixed gas transport line 115.

In addition, the system 200 may also include an oxygen separating unit 250 that may receive an oxygen/water output stream from the electrolyzer 210 via an oxygen/water output line 212. The oxygen separating unit 250 may separate oxygen from the water in the oxygen/water output stream, and supply the separated oxygen via a separated oxygen line 213 to the mixed gas transport line 115. The separated oxygen may be transported in the mixed gas transport line 115 to the blast furnace 220 along with the supplied hydrogen and the recovered hydrogen. The water from the oxygen/water output stream that remains after the oxygen is separated may be recycled via a recycled water line 214 back into the water feed line 211 that may feed water to the electrolyzer 210.

Figure 2B:
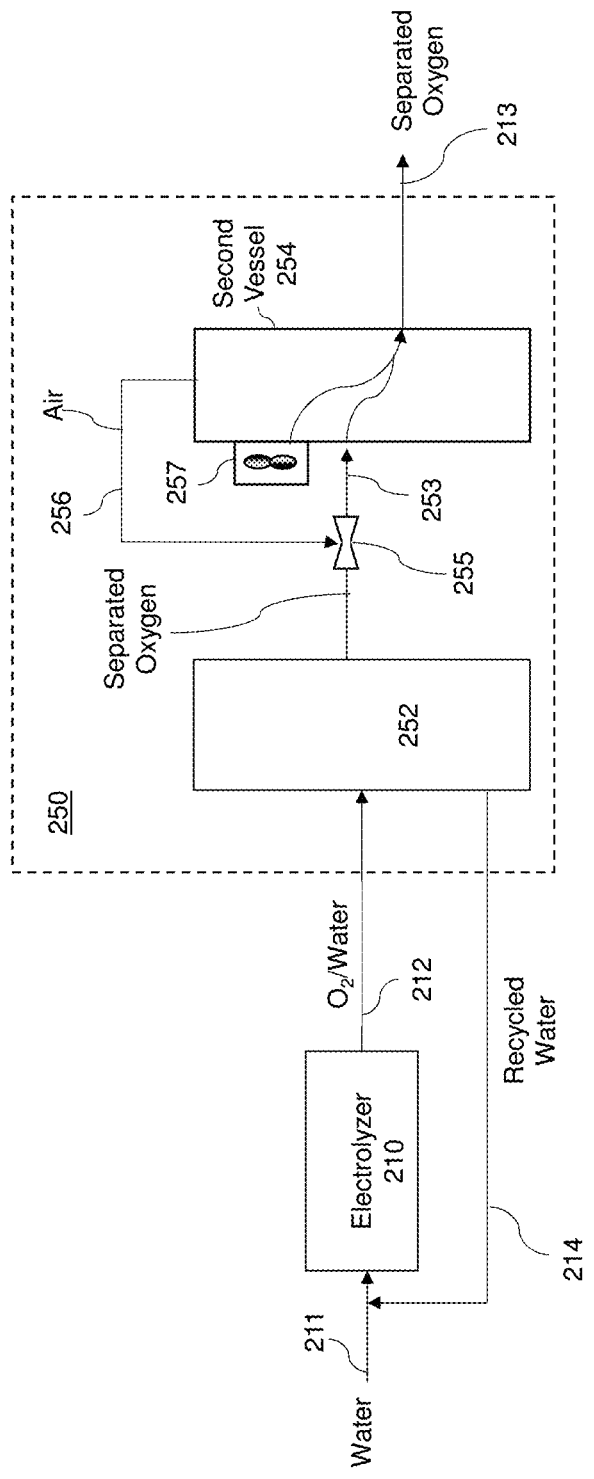
FIG. 2B illustrates an oxygen separating unit, according to one or more embodiments.

FIG. 2B illustrates an oxygen separating unit 250, according to one or more embodiments. Generally, the oxygen separating unit 250 may provide a mechanism for harvesting oxygen output from the anode side of the electrolyzer 210. The oxygen separating unit 250 may allow the system 200 to mix oxygen from the electrolyzer 210 with air to enrich the air that may be provided to the blast furnace 220 with higher oxygen percentage (within safe limits). This may further help to enhance the combustion process in the blast furnace 220.

As illustrated in FIG. 2B, the oxygen separating unit 250 may include a first vessel 252 (e.g., tank, cannister, etc.) that may receive the oxygen/water output stream from the electrolyzer 210 (e.g., an anode flow of the electrolyzer 210) via the oxygen/water output line 212. In the first vessel 252, oxygen may separate from the oxygen/water output stream due to the expanded volume of the first vessel 252. Any water that remains after the separation of oxygen may be transferred from the first vessel 252 back to the water feel line 211 by the recycled water line 214.

The separated oxygen may be transferred from the first vessel 252 to a second vessel 254 (e.g., plenum, manifold, etc.), in the oxygen separating unit 250 via an oxygen transfer line 253 (e.g., conduit). The oxygen transfer line 253 may include a venturi 255 for aspirating air into the separated oxygen. The venturi 255 may dilute (e.g., with air) the separated oxygen to an appropriate and safe level. The oxygen transfer line 253 may then transfer the separated oxygen that has been diluted in the venturi 255 to the second vessel 254.

The second vessel 254 may serve as a mixing/exhaust plenum that may ensure that the exhaust concentration in the separated oxygen is continuously safe. The second vessel 254 may include a blower or fan 257 that may blow ambient air from outside the second vessel 254 into the second vessel 254. An air stream generated by the blower or fan 257 may be fed from the second vessel 254 back to the throat of the venturi 255 through an air return conduit 256 and used therein to dilute the separated oxygen that exits the first vessel 252. The air stream may also force the separated oxygen (e.g., along with air from the air stream) out of the second vessel 254 and into the separated oxygen line 213. That is, the separated oxygen that is supplied to the mixed gas transport line 115 via the separated oxygen line 213 may include an amount of air that may be added to the separated oxygen for safety. In an alternative design, the second vessel 254 may be omitted and the separated oxygen may be transferred from the outlet of the venturi 254 via the oxygen transfer line 253 directly to the separated oxygen line 213 (e.g., directly to the blast furnace 220 without further dilution in the second vessel 254).

The pressure ($P_1$) in the first vessel 252 may be greater than the pressure ($P_2$) in the second vessel 254. The pressure ($P_2$) in the second vessel 254 may be greater than ambient pressure. Both of the first vessel 252 and second vessel 254 may be equipped with relief valves in order to avoid an unsafe pressure in the first vessel 252 and second vessel 254.

Thus, in general, the oxygen separating unit 250 may include a first device (e.g., electrolyzer 210) which may generate a first gas type (e.g., oxygen/water, such as water with gaseous oxygen dissolved therein). The first device may be fluidly connected to a first volume (e.g., first vessel 252). Water and oxygen may separate in the first volume, and the water may be then recirculated back to the first device. The gases (e.g., separated oxygen) may be discharged from the first volume into a second volume (e.g., second vessel 254) via an aspirating device (e.g., venturi 255). The aspirating device may dilute the oxygen in the gases discharged from the first volume and create a pressure drop in order to create a gaseous boundary between the second volume. The second volume may include a plenum for mixing air with the diluted oxygen from the aspirating device. The second volume may create a dilution with a second gas type (e.g., air) such that a concentration of oxygen in the discharged gas (e.g., the separated oxygen that exits the oxygen separating unit 250) is not at a hazardous level.

The oxygen separating unit 250 may provide advantages to the method of operation in the system 200. For example, in a first case where no oxygen is drawn from the first volume (e.g., first vessel 252), oxygen may be partially diluted in the venturi 255, oxygen may be fully diluted in the second volume (e.g., second vessel 254), and the exhaust (e.g., separated oxygen) that exits the oxygen separating unit 250 may be non-hazardous. Further, standard components such as one or more blowers or fans 257 may be used for dilution in the second volume.

In a second case where oxygen is drawn from the second volume (e.g., second vessel 254), a compressor or blower 257 may draw pure oxygen from the second volume to a maximum extent, but such that a pressure in the second volume (P2) remains above the pressure in the first volume (P1) in process control to that compressor or blower such that the purity of oxygen may be maintained. That is, there may be no mixing of oxygen with air in the first volume, and there is only mixing with air in second volume.

A transition from the first case to the second case or vice-versa may be seamless in that there may not be any required operation of valves or other components which could create safety concerns. Furthermore, the equipment may transition between modes very smoothly.

Figure 2C:
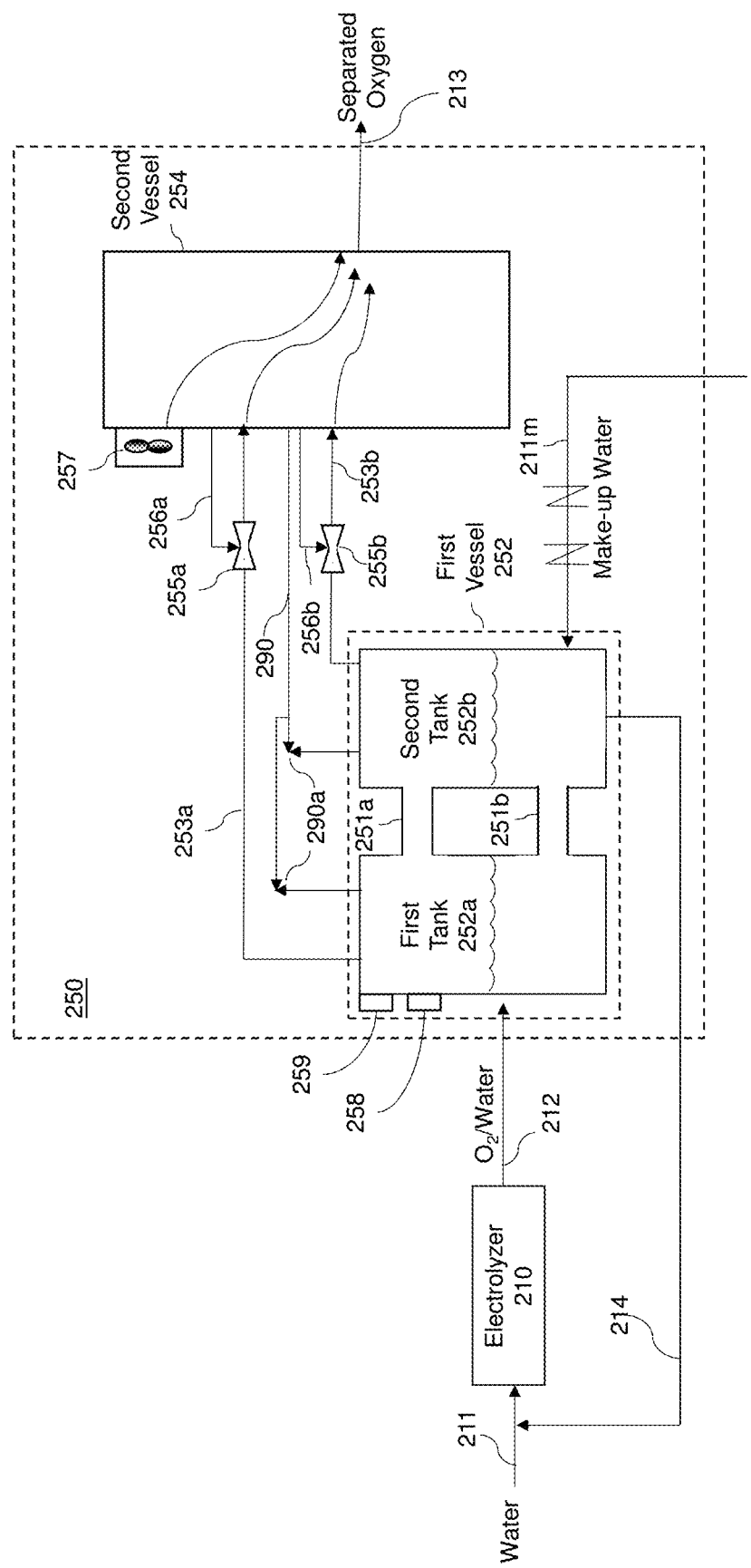
FIG. 2C illustrates an alternative design for the oxygen separating unit, according to one or more embodiments.

FIG. 2C illustrates an alternative design for the oxygen separating unit 250, according to one or more embodiments. In this alternative design, the oxygen separating unit 250 may include the first vessel 252 and second vessel 254 as in FIG. 2B. However, the first vessel 252 in this alternative design may include a first tank 252a and a second tank 252b. The first tank 252a and second tank 252b may include a first fluid connection (e.g., pipe, etc.) 251a above a water level to allow the exchange of gases (e.g., oxygen) between the first tank 252a and second tank 252b, and a second fluid connection (e.g., pipe, etc.) 251b below the water level to allow the exchange of water between the first tank 252a and second tank 252b. The oxygen/water output stream from the electrolyzer 210 may be input to the first tank 252a. Make-up water may supplied to the second tank 252b by a make-up water supply line 211m in order to maintain the water level (e.g., height) in the first tank 252a and second tank 252b above a predetermined height.

A pressure in the first tank 252a and the second tank 252b may be about 14.7 psig. The oxygen separating unit 250 may include one or more pressure sensors 258 that may be located in the first tank 252a and/or the second tank 252b. The pressure sensors 258 may allow a pressure in the first tank 252a and/or second tank 252b to be monitored and controlled. The oxygen separating unit 250 may also include an emergency stop device 259 that stops an operation in the oxygen separating unit 250 (e.g., an input of the oxygen/water output stream to the first tank 252a) if the pressure sensor(s) 258 detect a pressure that is above a predetermined value.

The separated oxygen may be transferred from the first tank 252a to the second vessel 254 via a first oxygen transfer line 253a. The first oxygen transfer line 253a may include a first venturi 255a for aspirating air into the separated oxygen. The separated oxygen may be transferred from the second tank 252b to the second vessel 254 via a second oxygen transfer line 253b. The second oxygen transfer line 253b may include a second venturi 255b for aspirating air into the separated oxygen.

An air stream generated by the fan or blower 257 may be fed from an upper part of the second vessel 254 (e.g., high in the exhaust plenum) back to the throats of the first venturi 255a and the second venturi 255b through respective air return conduits 256a and 256b. This air may be used in the first venturi 255a and second venturi 255b to dilute the separated oxygen that exits the first tank 252a and second tank 252b, respectively. The first venturi 255a and second venturi 255b may be sized for a back pressure at 14.7 psi at full oxygen flow, and aspirate dilution air at a ratio of about 2 to 1. The air stream may also force the separated oxygen (e.g., along with air from the air stream) out of the second vessel 254 and into the separated oxygen line 213.

The oxygen separating unit 250 in this alternative design may also include a pressure relief line 290 that is fluidly connected between the second vessel 254 at one end and the first tank 252a and second 252b at the other end. The pressure relief line 290 may include a pair of pressure relief valves 290a (e.g., 20 psig pressure relief valves) in order to maintain a safe pressure in the first tank 252a and second tank 252b.

In this alternative design, the oxygen separating unit 250 may include multiple redundant components, such as redundant venturis 255. The oxygen separating unit 250 may also include one or more pressure sensors to monitor the first pressure P1 in the first vessel 252 and/or the second pressure P2 in the second vessel 254. The oxygen separating unit 250 may also include a mechanism for arresting or impeding an input of the oxygen/water output stream to the first vessel 252 if the second pressure P2 is too high. In addition, the oxygen separating unit 250 may include one or more pressure relief devices (e.g., pressure relief valves) in the first vessel 252 and/or second vessel 254 to provide a safety backup to the function of the one or more venturis 255 to ensure that a safety threshold of pressure (e.g., in the second vessel 254) is not exceeded.

Referring again to FIG. 2A, a recovered hydrogen line 105 may be fluidly connected to the cathode outlet of the hydrogen pump 230 and to the mixed gas transport line 115, so as to transport the recovered hydrogen from the hydrogen pump 230 to the mixed gas transport line 115. A nitrogen/air line 107 may also be fluidly connected to the mixed gas transport line 115, so as to input nitrogen and/or air into the mixed gas transport line 115. The air that is transported in the nitrogen/air line 107 may be pre-heated (e.g., by a Cowper stove) prior to entering the nitrogen/air line 107. A coal input structure (e.g., a pulverized coal conveyor) 123 may also be connected to the mixed gas transport line 115, so as to input pulverized coal into the mixed gas transport line 115. Thus, in total, the mixed gas transport line 115 may transport to the blast furnace 220 the mixed gas (e.g., supplied hydrogen, recovered hydrogen, separated oxygen, nitrogen and air) together with the pulverized coal.

Thus, in the system 200, supplied hydrogen (e.g., "green" hydrogen generated in the electrolyzer 210) and recovered hydrogen may be fed to the bottom of the blast furnace 220 along with pulverized coal and air. Part of the hydrogen and coal may react with the air and generate heat and the gases (along with pulverized coal) may rise up in the blast furnace 220, carrying heat and reducing ore to metal (e.g., reducing iron ore to iron) along the way. The nitrogen in the mixed gas may act as a heat transfer fluid as it rises in the blast furnace 220. Heat is generated in the blast furnace 220 as the pulverized coal is combusted by the air in the mixed gas. The exhaust gas exiting the blast furnace 220 into the exhaust line 129 may contain a gas mixture of nitrogen, unreacted hydrogen, carbon dioxide and carbon monoxide.

As further illustrated in FIG. 2A, the exhaust line 129 may contain a shift reactor 260 (e.g., a water-gas shift (WSG) reactor). The shift reactor 260 may be fluidly connected to a water supply line 261, and configured to react carbon monoxide and water (e.g., from the water supply line 261) in the exhaust gas to form hydrogen and carbon dioxide. The shift reactor 260 may include, for example, a multi-stage, fixed bed reactor containing one or more shift catalysts that convert carbon monoxide and water into additional hydrogen and carbon dioxide according to the following WGS reaction: $CO+H_2O \rightarrow H_2+CO_2$. The catalysts used in the shift reactor may include, for example, iron-based catalysts (e.g., chromium or copper promoted iron-based catalysts).

The shift reactor 260 may be the first step (e.g., not including the optional heat exchanger 140 formed in the exhaust line 129 between the blast furance 220 and the shift reactor 260) in treating the exhaust gas as it exits the blast furnace 220. The shift reactor 260 may be applied to the entire exhaust gas stream in the exhaust line 120, or top some fraction thereof. The exhaust gas may enter the shift reactor 260 at about 300° C. and exit (e.g., after the WGS reaction) at about 200° C. As a result of the WGS reaction in the shift reactor 260, the exhaust gas exiting the shift reactor 260 may have a higher concentration of hydrogen and carbon dioxide and lower concentration of carbon monoxide, than the exhaust gas entering the shift reactor 260.

A preferential oxidizer 270 may be included in the exhaust line 129 downstream from the shift reactor 260. An air supply line 271 may be fluidly connected to the preferential oxidizer 270. The preferential oxidizer 270 may be configured to preferentially oxidize carbon monoxide in the exhaust gas (e.g., the product stream that exits the shift reactor 260) to carbon dioxide using the air provided through the air supply line 271. The preferential oxidizer 270 includes one or more catalysts for preferentially oxidizing carbon monoxide in the exhaust gas. The catalysts may include, for example, one or more of noble metals (platinum, ruthenium, rhodium, palladium and/or gold), and/or transition metal oxide catalysts. In particular, a combination of catalysts such as ruthenium/aluminum oxide ($Al_2O_3$) or rhodium/aluminum oxide may be included as catalysts in the preferential oxidizer 270.

Another heat exchanger 140 may be formed in the exhaust line 129 between the shift reactor 260 and the preferential oxidizer 270. The heat exchanger 140 may reduce a temperature of the exhaust gas from about 200° C. to about 120° C. or less which may be the operating temperature the preferential oxidizer 270.

The exhaust gas exiting the preferential oxidizer 270 may be fed to the hydrogen pump 230. The hydrogen pump 230 may comprise a PEM fuel cell stack. Another heat exchanger 140 may be formed in the exhaust line 129 between the preferential oxidizer 270 and the hydrogen pump 230. The heat exchanger 140 may further reduce the temperature of the exhaust gas to 65° C. or less which may be the operating temperature the hydrogen pump 230.

The hydrogen pump 230 may have a plate and stack design to allow for adequate cooling in the hydrogen pump 230. While irreversible heat loss in an electrolyzer stack may be carried by the reactant water, in the case of the hydrogen pump 230 (e.g., PEM hydrogen pump), additional fluid may be provided for heat transfer. The heat transfer and the thermal control of the hydrogen pump 230 should be accurate to prevent dry out on one side and flooding on the other side.

Typical coolant channels may be either parallel or series. However, in at least one embodiment of the present disclosure, the hydrogen pump 230 may include both a parallel and series configuration with multiple inlet and outlet ports. Such a configuration may make it easy to perform temperature and delta temperature control (e.g., lateral control) in the hydrogen pump.

Figure 3A:
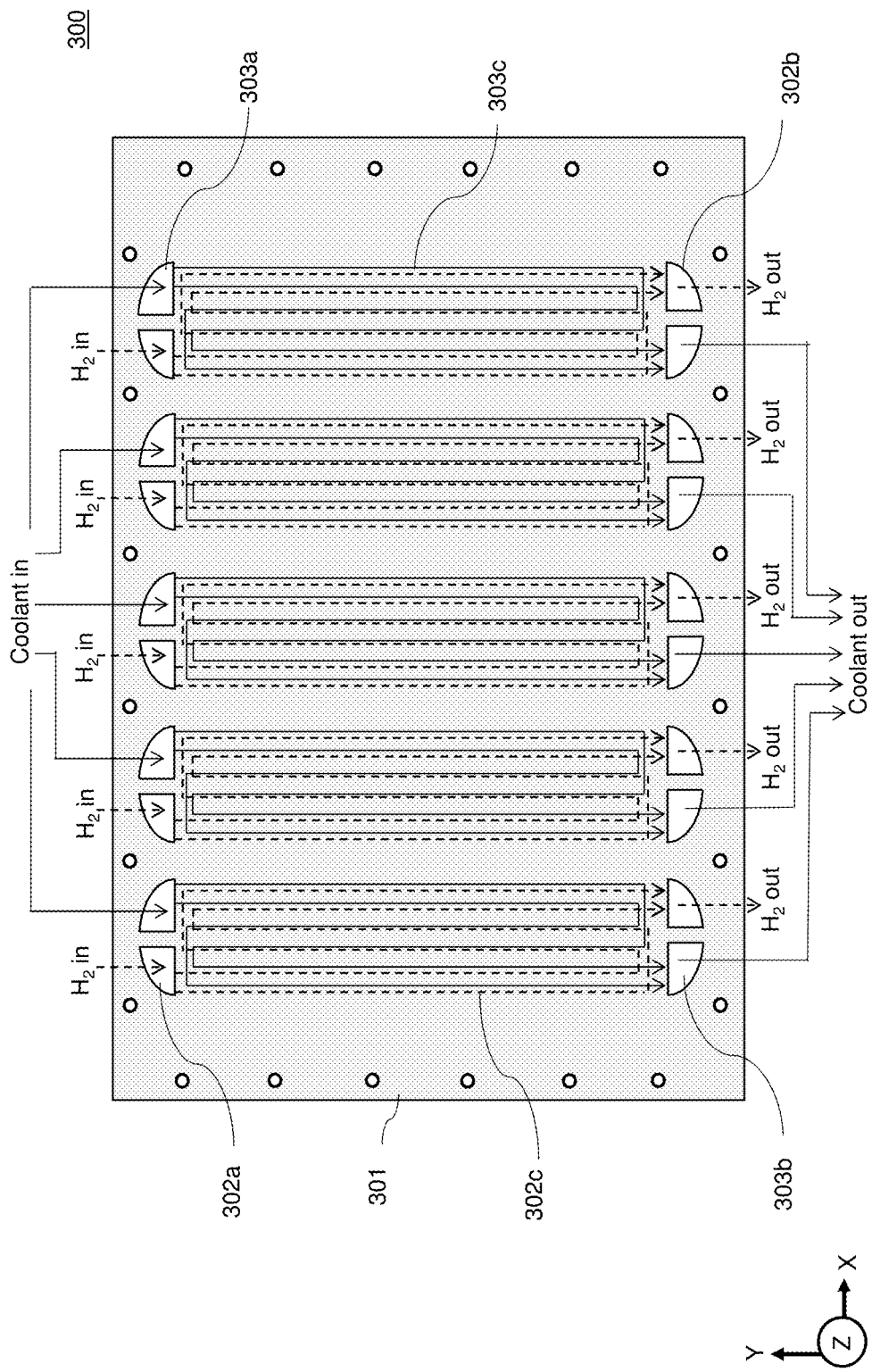
FIG. 3A illustrates a plate, according to one or more embodiments.
Figure 3B:
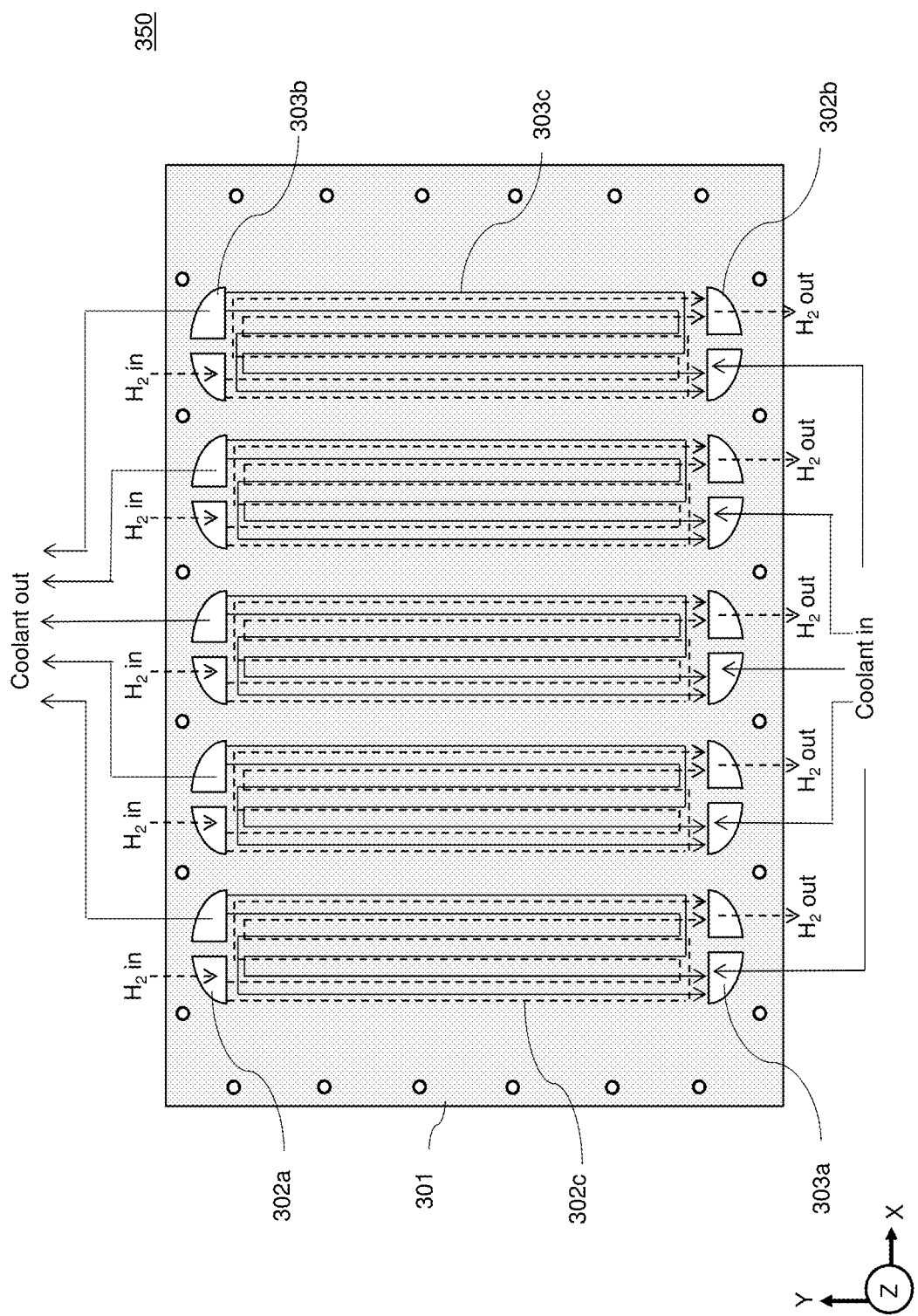
FIG. 3B illustrates another plate, according to one or more embodiments.

FIGS. 3A and 3B illustrate plates 300, 350 that may be included in hydrogen pump 230, according to one or more embodiments. The plates may be included, for example, in or adjacent to the cathode-side chamber (e.g., cathode-side chamber 233 in FIG. 1E) of the hydrogen pump 230.

In one or more embodiments, a hydrogen inlet of the plates 300, 350 may be fluidly connected to a recovered hydrogen exit port (e.g., recovered hydrogen exit port 239 in FIG. 1E) of the hydrogen pump 130 or 230. A hydrogen outlet of the plates 300, 350 may be fluidly connected, for example, to the recovered hydrogen line 105 in FIG. 2A.

FIG. 3A illustrates the plate 300, according to one or more embodiments. The hydrogen and coolant may have a co-directional flow in the plate 300.

The plate 300 may include a plate (e.g., metal plate) including a plurality of hydrogen inlets 302a and a plurality of hydrogen outlets 302b. One or more hydrogen channels 302c (e.g., dashed line) may fluidly connect the plurality of hydrogen inlets 302a to the plurality of hydrogen outlets 302b, respectively.

The plate 300 may also include a plurality of coolant inlets 303a and a plurality of coolant outlets 303b. One or more coolant channels 303c (e.g., solid line) may fluidly connect the plurality of coolant inlets 303a to the plurality of coolant outlets 303b, respectively. The plurality of coolant inlets 303a and plurality of coolant outlets 303b may be fluidly connected, for example, to a coolant pump that pumps a coolant (e.g., water) to the plurality of coolant inlets 303a, and receives coolant from the plurality of coolant outlets 303b, so that the coolant may be continuously circulated by the pump onto the plate 300.

FIG. 3B illustrates the plate 350, according to one or more embodiments. The hydrogen and coolant may have a counter-directional flow in the plate 350.

The plate 350 may include the plate (e.g., metal plate) including the plurality of hydrogen inlets 302a and a plurality of hydrogen outlets 302b. The plate 350 may also include the plurality of coolant inlets 303a and a plurality of coolant outlets 303b. However, in contrast to the plate 300 in FIG. 3A, in the plate 350 of FIG. 3B, the plurality of coolant inlets 303a are located on the opposite end of the plate 350 from the plurality of hydrogen inlets 302a, and the plurality of coolant outlets 303b are located on an opposite end of the plate 350 from the plurality of hydrogen outlets 302b.

Figure 4:
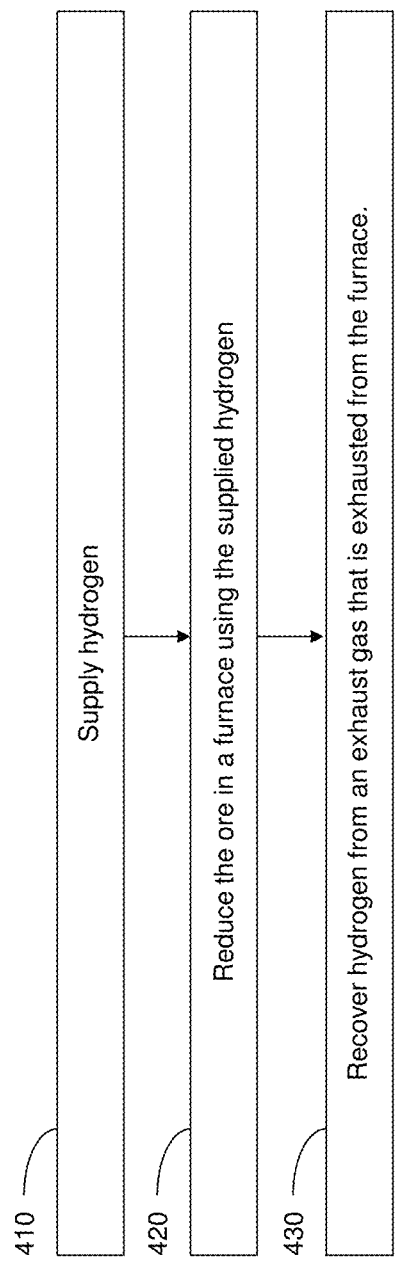
FIG. 4 illustrates a flow chart for a method of reducing ore, according to one or more embodiments.

FIG. 4 illustrates flow chart for a method of reducing ore, according to one or more embodiments. The method may include a Step 410 of supplying hydrogen, a Step 420 of reducing the ore in a furnace using the supplied hydrogen, and a Step 430 of recovering hydrogen from an exhaust gas that is exhausted from the furnace.

Thus, the embodiments of the present disclosure may include system architecture and system components for the recovery of hydrogen and heat when green hydrogen from an electrolyzer is used as a reducing agent and a thermal aid in blast furnace. The embodiments may also include a system design to aid in efficiency of oxygen harvesting from an electrolyzer. The embodiments may also include a plate and stack design of a hydrogen recovery unit to help recover hydrogen from a blast furnace exhaust.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for reducing ore, comprising:
a proton exchange membrane (PEM) electrolyzer configured to supply hydrogen;
a furnace configured to reduce the ore using the supplied hydrogen, the furnace fluidly connected to the PEM electrolyzer; and
a hydrogen recovery unit including a PEM hydrogen pump configured to recover hydrogen from an exhaust gas that is exhausted from the furnace, the hydrogen recovery unit fluidly connected to the furnace,
wherein the hydrogen recovery unit comprises series-parallel coolant flow channels fluidly connecting multiple inlets and outlets.

2. The system of claim 1, further comprising:
a mixed gas transport line fluidly connected to an outlet of the PEM electrolyzer and to an inlet of the furnace, and configured to transport the supplied hydrogen and the recovered hydrogen to the furnace;
an exhaust line fluidly connected to an outlet of the furnace and to an inlet of the PEM hydrogen pump, and configured to transport the exhaust gas from the furnace to the PEM hydrogen pump; and
a recovered hydrogen line fluidly connected to an outlet of the PEM hydrogen pump and to the mixed gas transport line, and configured to transport the recovered hydrogen from the PEM hydrogen pump to the mixed gas transport line.

3. The system of claim 2, further comprising a separating unit fluidly connected to the PEM electrolyzer configured to separate oxygen from water in a water/oxygen output stream of the PEM electrolyzer.

4. The system of claim 3, wherein the separating unit comprises:
a first vessel configured to separate the oxygen from the water in the water/oxygen output stream;
a second vessel containing an air fan or blower configured to dilute the separated oxygen with air;
a venturi having an inlet fluidly connected to the first vessel and an outlet fluidly connected to the second vessel; and
an air return conduit having an inlet fluidly connected to the second vessel and an outlet fluidly connected to a throat of the venturi.

5. The system of claim 4, wherein the first vessel comprises:
a first tank;
a second tank;
a first fluid connection between the first tank and the second tank located above a water level in the first tank and the second tank, and configured to allow exchange of oxygen between the first tank and the second tank;
a second fluid connection between the first tank and the second tank located below the water level in the first tank and the second tank, and configured to allow exchange of water between the first tank and the second tank;
a recycled water line fluidly connected to the first tank and configured to recycle the water to the PEM electrolyzer; and
a make-up water supply line fluidly connected to the second tank and configured to maintain the water level in the first tank and second tank above a predetermined height.

6. The system of claim 2, further comprising a heat exchanger fluidly connected to the exhaust line and the mixed gas transport line, and configured to heat the supplied hydrogen and the recovered hydrogen with heat from the exhaust gas.

7. The system of claim 6, further comprising:
a shift reactor fluidly connected to the exhaust line; and
a water supply line fluidly connected to the shift reactor, wherein the shift reactor is configured to react carbon monoxide in the exhaust gas with water provided from the water supply line to form hydrogen and carbon dioxide.

8. The system of claim 7, further comprising a preferential oxidizer fluidly connected to the exhaust line downstream from the shift reactor and configured to preferentially oxidize the carbon monoxide to carbon dioxide in the exhaust gas.

9. The system of claim 8, wherein the hydrogen pump comprises a plate comprising:
hydrogen inlets;
hydrogen outlets;
hydrogen channels fluidly connecting the hydrogen inlets to the hydrogen outlets;
coolant inlets;
coolant outlets; and
coolant channels fluidly connecting the coolant inlets to the coolant outlets in a series and parallel configuration.

10. The system of claim 1, wherein the furnace comprises a blast furnace.

11. A system, comprising:
an electrolyzer;
a blast furnace;
a first conduit fluidly connecting a hydrogen outlet of the electrolyzer to the blast furnace; and
a hydrogen recovery unit fluidly connected to the blast furnace configured to recover hydrogen from the blast furnace and recycle the recovered hydrogen to the blast furnace,
wherein the hydrogen recovery unit comprises series-parallel coolant flow channels fluidly connecting multiple inlets and outlets.

12. The system of claim 11, further comprising:
a second conduit fluidly connecting an oxygen outlet of the electrolyzer to the blast furnace.

* * * * *